(12) United States Patent
Oh et al.

(10) Patent No.: US 6,879,833 B2
(45) Date of Patent: Apr. 12, 2005

(54) METHOD AND SYSTEM FOR VOCODER BYPASS USING DIFFERENTIATED TELEPHONE NUMBERS

(75) Inventors: Dae-Sik Oh, Overland Park, KS (US); Deuk-Ho Ryu, Lenexa, KS (US); Leo Ray Anderson, Raymoore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 27 days.

(21) Appl. No.: 10/193,532

(22) Filed: Jul. 11, 2002

(65) Prior Publication Data

US 2004/0009787 A1 Jan. 15, 2004

(51) Int. Cl.[7] .............................. H04M 3/42; H04Q 7/20
(52) U.S. Cl. ................. 455/445; 455/415; 379/221.14; 379/219
(58) Field of Search .................... 455/445, 415, 455/560, 561, 453; 379/221.14, 219

(56) References Cited

U.S. PATENT DOCUMENTS

| | | | | |
|---|---|---|---|---|
| 5,608,779 | A | * | 3/1997 | Lev et al. ................ 455/436 |
| 6,070,089 | A | | 5/2000 | Brophy et al. |
| 6,091,969 | A | | 7/2000 | Brophy et al. |
| 6,185,424 | B1 | | 2/2001 | Pon et al. |
| 6,223,049 | B1 | * | 4/2001 | Aakula et al. .............. 455/519 |
| 6,256,612 | B1 | | 7/2001 | Vo et al. |
| 6,272,358 | B1 | * | 8/2001 | Brent et al. ................ 455/560 |
| 6,522,655 | B1 | * | 2/2003 | Laiho ........................ 370/410 |
| 2001/0006895 | A1 | * | 7/2001 | Della Mea ................ 455/453 |
| 2001/0024960 | A1 | * | 9/2001 | Mauger .................... 455/552 |
| 2002/0191693 | A1 | | 12/2002 | Nakagaki |
| 2003/0012221 | A1 | | 1/2003 | El-Maleh et al. |
| 2003/0125960 | A1 | | 7/2003 | Chu et al. |

OTHER PUBLICATIONS

3rd Generation Partnership Project 2 "3GPP2", Tandem Free Operation (Stage 1), 3GPP2 S.R0014, Dec. 13, 1999.
3rd Generation Partnership Project 2 "3GPP2", 3GPP2 Tandem Free Operation Specification, 3GPP2 A.S0004–A Release A, Jun. 13, 2001.
Airtouch™ Communications, Overview of IP Based Wireless Network Concepts, S00allip–20000106–003 (VFAT), pp. 1–11, dated before Jul. 11, 2002.
Copy of International Search Report prepared for PCT Application No. PCT/US03/21196, dated Oct. 2, 2003.
Copy of International Search Report prepared for PCT Application No. PCT/US03/21308, dated Oct. 3, 2003.

* cited by examiner

*Primary Examiner*—Nay Maung
*Assistant Examiner*—Edan Orgad

(57) ABSTRACT

A system and method are provided for using differentiated telephone numbers to determine whether to perform a vocoder bypass. In an exemplary embodiment, a mobile station may call a terminating node. An intermediate entity may search an identifier of the terminating node for a predetermined aspect. If the predetermined aspect is found, the terminating node may be a mobile station, and the intermediate entity may perform a vocoder bypass. If the predetermined aspect is not found, the terminating node may be a non-mobile station, and the intermediate entity may perform vocoding.

22 Claims, 3 Drawing Sheets

METHOD AND SYSTEM FOR VOCODER BYPASS USING DIFFERENTIATED TELEPHONE NUMBERS

FIELD OF THE INVENTION

The present invention relates to wireless communications and, more particularly, to a method and system for determining when to bypass the normal vocoder resident in a wireless communication system.

BACKGROUND OF THE INVENTION

I. End-to-end Communication

In a typical wireless communication system, a mobile station may digitize and encode an analog voice signal received from a user for transmission over an air interface to a radio access network. A base station controller ("BSC") within the radio access network may decode the encoded voice signal and send a digital representation of the voice signal to a network switch for transmission to another endpoint.

Similarly, the radio access network can receive a digital representation of a voice signal destined for a mobile station. The BSC within the radio access network would then encode the digital representation for transmission over the air interface to the mobile station. The mobile station may then decode the encoded voice, convert the underlying digital representation to an analog signal, and output the analog signal to a user.

When a voice call is placed between two mobile stations, the system is inherently inefficient, because the system will unnecessarily perform back-to-back decoding and encoding of data. Namely, a sending mobile station would encode a voice signal for transmission to an originating BSC. The originating BSC then decodes the voice signal sent from the mobile station, and sends the decoded signal through the radio access network to a receiving BSC, which could be the same as the original BSC. The receiving BSC would then encode the voice signal and transmit it to a receiving mobile station, which would then decode the voice signal. This back-to-back "vocoding" (voice decoding and/or encoding) can degrade signal quality and delay voice transmission.

II. Vocoder Bypass

One mechanism that can be used to overcome this problem is known as "tandem free operation" ("TFO") or "vocoder bypass." According to this mechanism, if a voice call is a mobile-to-mobile call (i.e., between mobile stations), then data may be passed transparently through the network between the mobile stations without back-to-back vocoding. On the other hand, if the voice call is between a mobile station and a non-mobile station, then the data may be vocoded for transmission to a switch serving the non-mobile station.

In processing a call, the network can determine whether a given call is mobile-to-mobile by looking up telephone numbers of the endpoints of the call in a database that correlates the telephone numbers with device types. If the database indicates that the telephone numbers for both terminating endpoints of a call correspond to mobile stations, the network may conclude that the call is a mobile-to-mobile call and could then perform vocoder bypass.

However, existing methods for determining whether to perform vocoder bypass may have a number of disadvantages. For example, such methods can have relatively long delays associated with looking up telephone numbers in a database. The time required to search such a database may be proportional to the size of the database. Thus, as a greater number of users begin using mobile devices, the size of the database may increase, and delays associated with looking up identifiers in the database may grow over time.

Additionally, looking up identifiers may complicate the process of making a call by adding another step, which may result in more dropped calls and a degraded signal quality. Furthermore, vocoder bypass is generally not supported between mobile stations using different wireless service providers. Thus, the use of vocoder bypass may be severely limited in a multi-carrier market.

SUMMARY

The present embodiments may be arranged to overcome the deficiencies associated with the prior art. An exemplary method may include receiving a first identifier for a first station and a second identifier for a second station. Additionally, the method may include determining whether the first identifier facially identifies a device type and whether the second identifier facially identifies the device type. Furthermore, the method may include performing vocoder bypass if the first identifier facially identifies the device type and the second identifier facially identifies the device type.

Another exemplary method may be carried out at an intermediate entity in communication with a first mobile station and a terminating node. The method may include receiving an identifier for the terminating node from the first mobile station via a wireless telecommunications network. Additionally, the method may include determining whether the identifier includes a predetermined aspect that identifies the terminating node as a second mobile station. Furthermore, the method may include performing a vocoder bypass if the identifier includes the predetermined aspect.

In another exemplary embodiment, an identifier for use in a wireless telecommunications network may include a telephone number for a node and a predetermined aspect. The predetermined aspect may identify whether the node is a mobile station. The predetermined aspect may have any value, but in the present method, may include a predetermined area code and/or an extension to the area code that identifies the node as a mobile station. Furthermore, the predetermined aspect may specify additional data, such as the network service provider for the node.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE EXEMPLARY EMBODIMENTS

I. Exemplary Vocoder Bypass using Identifiers

According to an exemplary embodiment, a telecommunications network may include a number of nodes, some of which may be mobile stations. A mobile station may be any number of different types of devices, such as a cellular phone, personal digital assistant (PDA), two-way pager, laptop computer, portable facsimile machine, or another wireless device. Each of the nodes within the network may have an identifier, which for a non-mobile station may simply be its standard telephone number. However, network service provider(s) within the network may provide each mobile station with an identifier that includes a differentiated telephone number. The differentiated telephone number may include a telephone number for the mobile station (e.g., a mobile identification number (MIN)) as well as a predetermined aspect that can identify the node as a mobile station.

An intermediate entity within the network may use identifiers to determine whether a node is a mobile station without querying a database. Thus, the intermediate entity may determine whether a voice call is a mobile-to-mobile call by simply looking at the identifiers for the initiating and terminating nodes. If a mobile-to-mobile call occurs, the intermediate entity may perform vocoder bypass without a database lookup. This can result in a simpler, faster, and cheaper mechanism for performing vocoder bypass. However, if the mobile station calls a non-mobile station, the intermediate entity may perform vocoding.

Network service provider(s) may assign identifiers to mobile stations in a number of different ways. For example, while telephone numbers have traditionally included 3-digit area codes, identifiers for mobile stations may have four or five digit area codes. Alternatively, identifiers for mobile stations may include systematic patterns (e.g., differentiated area codes or keystroke sequences) that are not present in the telephone numbers of non-mobile stations.

Additionally, network service provider(s) may assign identifiers such that a mobile station is not only identified as a mobile device, but the network service provider that the mobile station uses is also identified. For example, if a mobile station has an identifier with a four or five digit area code, the one or two additional digits could uniquely identify the network service provider that the mobile station uses. The intermediate entity may then determine that a call is a mobile-to-mobile call within a given network service provider by determining that both the initiating and terminating nodes include the same additional digits in their area code. Since vocoder bypass is generally not performed when the initiating and terminating nodes have different network service providers, the present embodiments may enable the network system to more readily determine whether vocoder bypass can be performed.

II. Exemplary Network System

Figure 1:
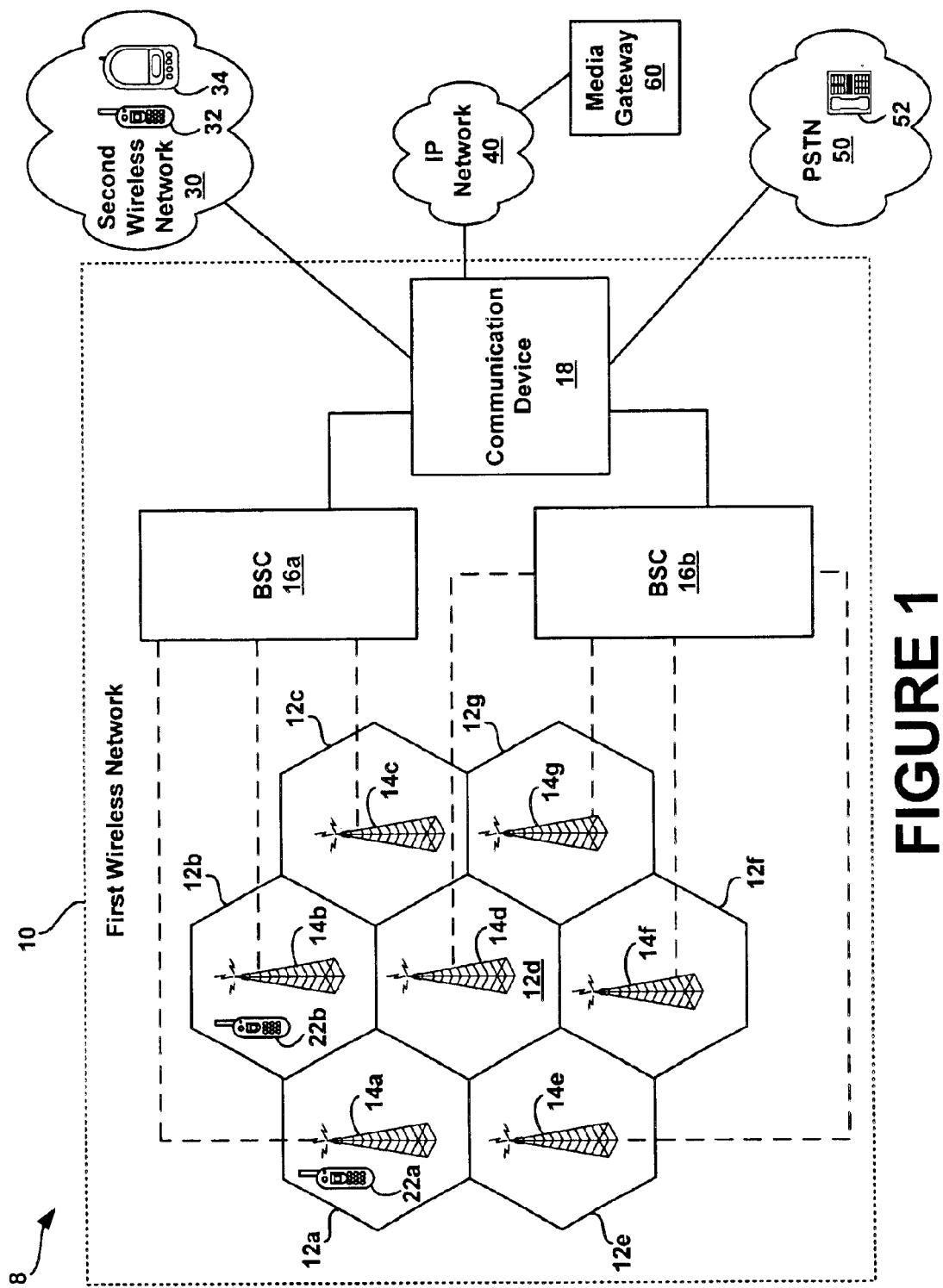
FIG. 1 shows an exemplary embodiment of a network system.

FIG. 1 is a simplified block diagram that illustrates an exemplary network system 8, such as can be used for performing vocoding and vocoder bypass. The network system 8 may include a first wireless network 10 in communication with a second wireless network 30, an Internet Protocol ("IP") network 40 (e.g., the Internet), and a Public Switched Telephone Network (PSTN) 50. Additionally, a media gateway 60 in communication with the IP network 40 may enable other networks (e.g., additional PSTNs or wireless networks) to send and receive data with the IP network 40, and in turn with the first wireless network 10.

A. Exemplary Wireless Network

In the present embodiment, the first wireless network 10 uses Code-Division Multiple Access ("CDMA") technology, though other types of wireless technologies, such as Time-Division Multiple Access ("TDMA"), Frequency-Division Multiple Access ("FDMA"), Wideband CDMA ("W-CDMA"), Global System for Mobile Communications ("GSM"), 802.11, and Bluetooth, may also be used. Furthermore, the network 10 may include multiple cells 12a–g, each of which is defined by a radio frequency ("RF") radiation pattern from a respective base transceiver station ("BTS") 14a–g. FIG. 1 depicts each of the cells 12a–g in an idealized fashion, as hexagons that do not overlap. Alternatively, however, the cells 12a–g may overlap and vary widely in shape and size due to topography, signal strength, and other factors. Furthermore, it should be understood that the first wireless network 10 may have more or fewer cells in alternate embodiments, or that the network 10 may alternatively not even use cells at all.

In the first wireless network 10, each of the cells 12a–g may employ one or more carrier frequencies for communication with mobile stations inside the cell. The number of carrier frequencies employed by a given cell may depend on various factors, such as the density of communication traffic expected in the site. In a congested city area, for example, a given cell may employ three or four carrier frequencies, while in a sparsely populated rural area, a cell may employ only one or two carrier frequencies. It should be understood that more or fewer carrier frequencies may be used within the network 10, depending on the desired functionality of the network 10.

Additionally in the first wireless network 10, the BTSs 14a–c may communicate with a base station controller ("BSC") 16a. Similarly, the BTSs 14d–g may communicate with a BSC 16b. Each of the BSCs 16a–b in turn may communicate with a communication device 18, which may be located at a Central Office (CO) of a telephone company. In the present embodiment, the communication device 18 may be, for example, a mobile switching center (MSC) or a media gateway providing connectivity to circuit-switches and BSCs. Alternatively, the communication device 18 may be a BSC that enables communication to other network components (e.g., MSCs, other BSCs, and/or circuit switches). The communication device 18 may also enable communication with one or more other networks, such as the second wireless network 30, the IP network 40, and/or the PSTN 50.

B. Exemplary BSCs

Typically, a BSC for a cell manages the air interface between a BTS and a mobile station that is currently operating in the cell. For example, FIG. 1 depicts two such mobile stations 22a–b within cells 12a–b, respectively. It should be understood that more or fewer mobile stations may be present in each cell. In the present embodiment, the BSC 16a may control calls involving mobile stations 22a–b, respectively. The BSCs 16a–b may also be responsible for managing handoff of signaling and call traffic as a mobile station moves between cells 12a–g within the network 10. Additionally, the BSCs 16a–b may be responsible for controlling power levels and frequency allocation for the air interface between BTSs and mobile stations.

Furthermore, in the present embodiment, mobile stations in communication with the BSCs 16a–b may include Enhanced Variable Rate Codecs ("EVRCs") for converting analog voice signals from users into CDMA signals. The mobile stations may then send the resulting CDMA signals over an air interface to the BTSs 14a–g and in turn to the BSCs 16a–b. Thus, the BSCs 16a–b may also include EVRCs to convert the CDMA signals received from the mobile stations into Pulse Code Modulation (PCM) signals. The BSCs may perform vocoding by using their EVRCs if a terminating node is a non-mobile station. However, if a terminating node is a mobile station, the BSCs 16a–b may perform a vocoder bypass and pass the CDMA signal on to the answering terminal device without vocoding.

In the present embodiment, a CDMA signal can have a bandwidth of 8 Kilobytes or 13 Kilobytes, and a PCM signal may have a bandwidth of 64 Kilobytes, but it should be understood that this may vary in alternate embodiments.

Additionally, although the present vocoders convert between CDMA and PCM signals, it should be understood that other types of vocoding or signal conversion mechanisms may also be used in the present embodiment. For example, an alternate vocoding mechanism may be used that converts, for example, between Global System for Mobile Communications (GSM) and PCM or Global Packet Radio Service (GPRS) and PCM.

The BSCs 16a–b may also include bypass mechanisms designed to bypass the EVRC vocoders. These bypass mechanisms can be implemented in hardware, software, or a combination of both. The bypass mechanisms may include, for example, any number of different components, such as computer-readable software programs, physical switches such as transistors designed for breaking data flow to the EVRC vocoders, circuit breakers, and so forth.

C. Exemplary Communication Device

In the present embodiment, the communication device 18 may control the BSCs 16a–b. Thus, the communication device 18 may serve as a general control element for the network 10. The communication device 18 may perform a number of duties, such as setting up and switching calls to and from the cells 12a–g, providing for backup in the case of cell failure, interfacing with the wireless network 10, monitoring traffic to facilitate billing, performing testing and diagnostic services, and performing other network management functions. Additionally, the communication device 18 may assign a frame selector for each call passing through it, and the frame selector may be a unique identification value that identifies each call.

The communication device 18 may also determine whether to perform vocoding or vocoder bypass. If the call originating from a mobile station is destined for another mobile station, the communication device 18 may pass a CDMA signal along to a destination BSC without vocoding the CDMA signal. The destination BSC may subsequently send the CDMA signal over the air interface to the destination mobile station. On the other hand, if the call is destined for a non-mobile station, then the originating BSC and/or the communication gateway 18 may decode the CDMA signal and send a PCM signal representative of the underlying voice signal to a circuit-switch for transmission to the destination non-mobile station.

D. Additional Exemplary Networks

The second wireless network 30 may be similar to the first wireless network 10, and may include any number of mobile devices. As depicted in FIG. 1, the second wireless network 30 includes a mobile station 32 and a PDA 34. The mobile station 32 may be similar to the mobile stations 22a–b and enable wireless communications with another endpoint. The PDA 34 may provide a user with wireless connectivity to any number of different networks, such as the networks 10, 30, 40, 50, 60. The second wireless network 30 may also include BSCs having vocoders, similar to the BSCs 16a–b. During vocoder bypass, the first wireless network 10 may use signaling such as ISUP signaling to prevent the second wireless network 30 from vocoding. It should be understood that the network 30 may alternatively include more or fewer components that are different than those described here. Also, it should be understood that wireless devices within the network system 8 (e.g., mobile stations 22a–b, 32, and PDA 34) may use any type of wireless channel (e.g., access channel, traffic channel, paging channel, etc.) when sending data.

The PSTN 50 may be a standard landline telephone network that includes any number of Signal Control Points (SCPs), Signal Switching Points (SSPs), Signal Transfer Points (STPs), COs, and non-mobile stations, such as a landline telephone 52. As mentioned previously, the IP network 60 may be any type of network that forwards and receives IP packets, such as the Internet. It should be understood that in alternate embodiments, the network system 8 may include more or fewer networks having different arrangements. For example, the network system 8 may alternatively include a TDMA network, an FDMA network, a GSM network, a Bluetooth network, and/or an 802.11 network.

It should be further understood that this and other arrangements described herein are illustrative only, and other arrangements and other elements (e.g., machines, interfaces, functions, etc.) can be used within the network system 8 instead. Additionally, some elements within the network system 8 may be omitted altogether. Further, as in most telecommunications applications, those skilled in the art will appreciate that many of the elements described herein are functional entities that may be implemented as discrete components, in any suitable combination and location.

For example, although FIG. 1 depicts the BSCs 16a–b and the communication device 18 as separate entities, the functions of the BSCs 16a–b may be integrated into the communication device 18, thereby eliminating the separate BSC entities 16a–b. Alternatively, the BSCs 16a–b may pass data between one another via an independent data connection (e.g., T1 line) that does not pass through the communication device 18. As another example, although FIG. 1 shows the BSCs 16a–b and BTSs 14a–g as separate entities, these two entities could be co-located or could otherwise be viewed cooperatively as a base station system (BSS). As still another example, while FIG. 1 shows the BTSs 14a–g grouped under the control of the two BSCs 16a–b, all of the BTSs 14a–g could instead be controlled by a common BSC. Further, as yet another example, the communication device 18 may instead be controlled by another entity, such as a session manager.

III. Exemplary Identifiers

Figure 2:
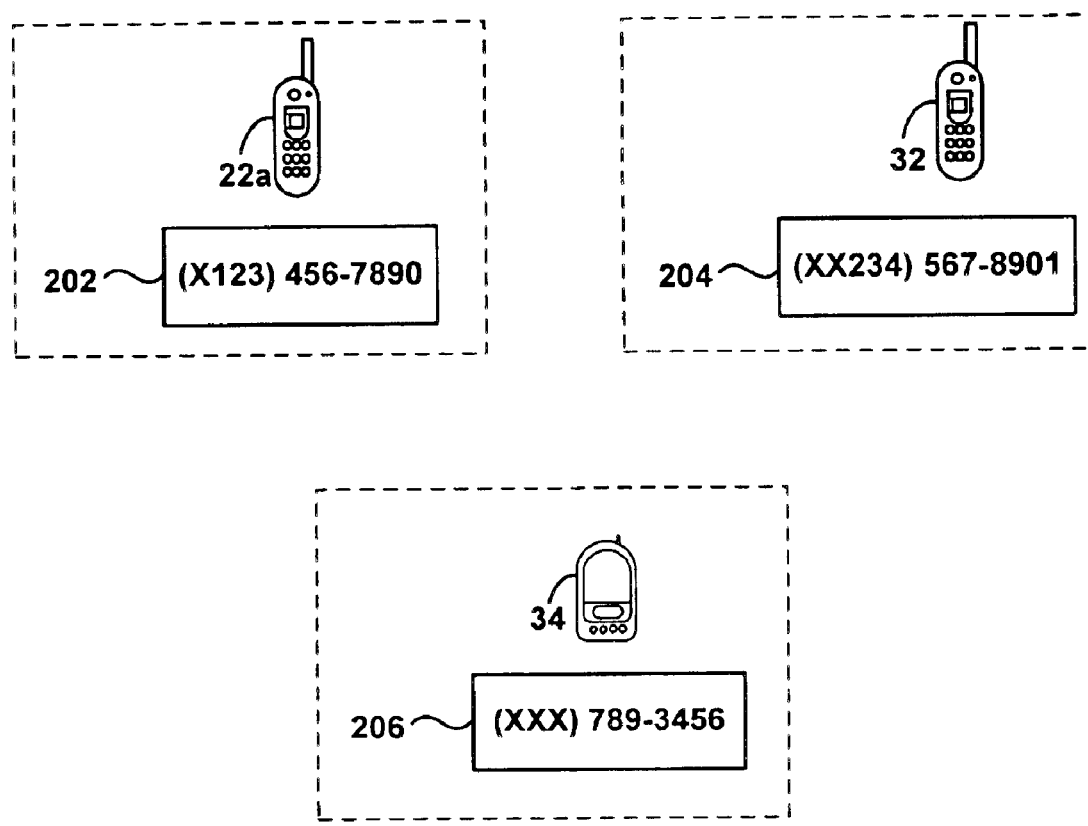
FIG. 2 shows exemplary embodiments of identifiers for use within the network system of FIG. 1.

Turning now to FIG. 2, exemplary embodiments of identifiers 202, 204, 206 are shown for use with the exemplary network system 8. Each of the identifiers 202, 204, 206 may be associated with a node within the network system 8. For example, the mobile station 22a may have the identifier 202, the mobile station 32 may have the identifier 204, and the PDA 34 may have the identifier 206.

In the present embodiment, each of the identifiers 202–206 may include a predetermined aspect and a telephone number. An intermediate entity within the network system 8, such as the BSCs 16a–b and/or the communication device 18, may use the predetermined aspect to determine whether a corresponding node is a mobile station. For example, by dialing a predetermined aspect when calling a terminating node, a mobile station initiating a call may notify an intermediate entity that the terminating node is a mobile station. Additionally, a mobile station initiating a call may automatically include a predetermined aspect within its own identifier in order to notify the intermediate entity that the initiating node is a mobile station. It should be understood that the intermediate entity is not limited to the components and functionality described here and may alternatively include any component within the network system 8.

In an exemplary embodiment, a predetermined aspect may include an area code extension for a telephone number. For example, as depicted in FIG. 2, the identifier 202 may have the value "(x123) 456-7890", where "x" is a predetermined aspect and "(123) 456-7890" is a telephone number for the mobile station 22a. Similarly, the identifier 204 may have the value "(xx234) 567-8901" with a predetermined aspect of "xx" and a telephone number of "(234) 567-8901" for the mobile station 32. In each of these embodiments, each "x" within the predetermined aspect may represent any one-digit integer. Thus, a user on a mobile station may dial a one-digit extension when dialing the mobile station 22a, and the user may dial a two-digit extension when dialing the mobile station 32.

Alternatively, a predetermined aspect may include a predetermined area code for a telephone number. For example, as depicted in FIG. 2, the identifier 206 may have the value "(xxx) 789-3456", with a predetermined aspect of "xxx" and a telephone number of "(xxx) 789-3456", where each "x" represents a one-digit integer. In this embodiment, the predetermined aspect is part of the area code of the telephone number. Therefore, the predetermined aspect in this embodiment may perform the function of routing the call to an area code as well as notifying an intermediate entity that the device corresponding to the identifier is a mobile station.

Furthermore, a predetermined aspect may include additional information about a node other than just simply identifying the node as a mobile station. Thus, depending on the value of predetermined aspect, various information may be specified about the node. To illustrate, in an exemplary scenario, the value within the predetermined aspect may specify the type of network service provider used by the node. For example, for the identifier 202, a first network service provider (e.g., Sprint PCS) may have the value "1", a second network service provider may have a value of "2", and so on. It should be understood that the "x" may alternatively specify any number of other types of information.

It should be further understood that the predetermined aspects, telephone numbers and identifiers depicted in FIG. 2 are merely exemplary, and that different values may alternatively be used for each. For example, each "x" within a predetermined aspect may alternatively represent an integer of any digit size (e.g., each "x" may represent a 7-digit integer). Additionally, each predetermined aspect may alternatively include any number of "x's". Furthermore, each "x" may alternatively represent values other than integers, such as ASCII characters, irrational numbers, and fractions. It should also be understood that alternate identifiers may include a predetermined aspect "x" that is dialed within or after the telephone number (e.g., "(123) 4×6-78×0", "(123) 456-7890xx"). Additionally, in an alternate embodiment, the intermediate entity may process an identifier before obtaining the desired predetermined aspect. For example, the intermediate entity may filter the identifier, perform binary arithmetic on the identifier, compare the identifier to a template, mask the identifier, or perform some other process on the identifier before obtaining the desired predetermined aspect.

A telephone number within an identifier may also have a different form than shown in FIG. 2. For example, the present embodiments may also be applied to international or foreign telephone numbers. In another example, an identifier may alternatively include an addressing mechanism that is different than a telephone number. For example, an alternate identifier may include an IP address, Media Access Control (MAC) address, and/or other addresses. Such alternate identifiers may also include a predetermined aspect for identifying a corresponding node as a mobile station.

IV. Exemplary Method for Performing Vocoder Bypass

Figure 3:
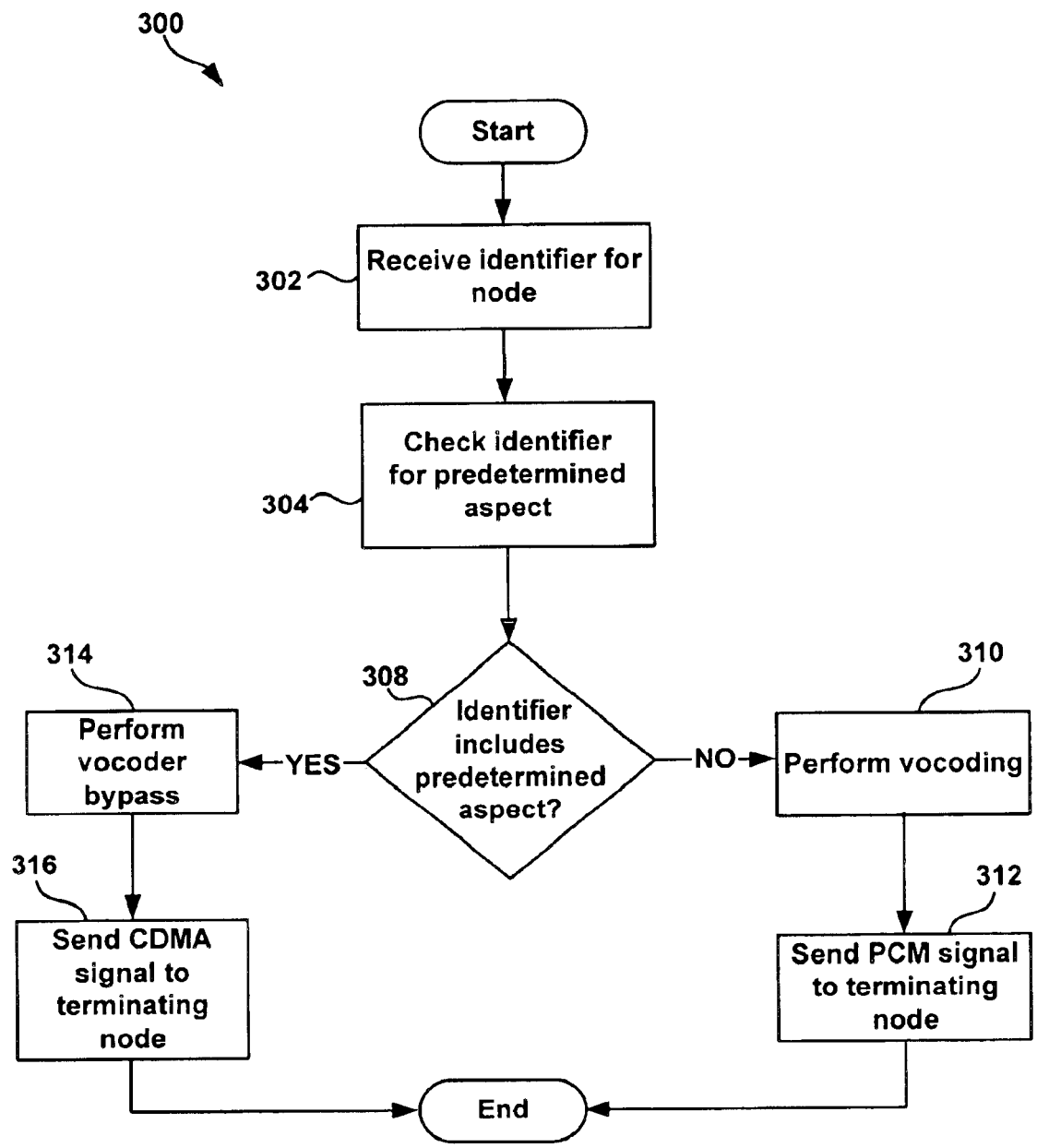
FIG. 3 shows an exemplary method of performing vocoder bypass within the network system of FIG. 1.

Turning now to FIG. 3, an exemplary method 300 is shown for performing vocoder bypass using the network system 8 depicted in FIG. 1. In step 302, a mobile station, such as the mobile station 22a, may call a terminating node using the network system 8. Thus, an intermediate entity within the network system 8 may receive an identifier for a terminating node from the mobile station. As described previously, data received from a mobile station within the network system 8 may be transmitted within a CDMA signal that is representative of an analog voice signal produced by a user.

In step 304, the intermediate entity may check the received identifier for a predetermined aspect. This step may involve filtering the identifier, performing binary arithmetic on the identifier, comparing the identifier to a template, masking the identifier, or otherwise processing the identifier before obtaining a predetermined aspect. It should be understood that in an alternate embodiment, the present step 304 may also involve checking the identifier of the initiating node to ensure that it is also a mobile station.

In step 308, the intermediate entity may determine whether the identifier for the terminating node includes the predetermined aspect. If the identifier does not include the predetermined aspect, the intermediate entity can determine that the terminating node is not a mobile station, and the method 300 would proceed to step 310. During step 310, the intermediate entity performs vocoding by converting the CDMA signal received from the originating mobile device into a PCM signal. At step 312, the intermediate entity sends the PCM signal to the terminating node.

Returning to the determination in step 308, if the identifier includes the predetermined aspect, the intermediate entity will determine that the terminating node is a mobile station, and the method 300 would proceed to step 314. At step 314, the intermediate entity performs vocoder bypass, which may involve employing a bypass mechanism to prevent the use of the vocoder. Additionally, the intermediate entity may inform a BSC or other component responsible for vocoding within the second wireless network 30 not to perform vocoding on the CDMA signal for this call, since the intermediate entity is employing vocoder bypass. At step 316, the intermediate entity will send the CDMA signal to the terminating node.

It should be understood that a wide variety of changes and modifications may be made to the embodiments of the network system 8 described above. Furthermore, certain components, functions, and operations of the network system 8 of the present embodiments may be accomplished with hardware, software, or a combination of the two. It is therefore intended that the foregoing description illustrates rather than limits this invention, and that it is the following claims, including all equivalents, that define this invention:

What is claimed is:

1. A method for performing vocoder bypass in a wireless telecommunications network, the method comprising:

receiving a first identifier for a first station and a second identifier for a second station;

determining whether the first identifier facially identifies a device type by determining whether the first identifier includes a first predetermined aspect indicative of a mobile station;

determining whether the second identifier facially identifies a device type by determining whether the second identifier includes a second predetermined aspect indicative of a mobile station, wherein at least one of the first predetermined aspect and the second predetermined aspect comprise an area code extension; and responsive to a determination that the first identifier facially identifies the device type and the second identifier facially identifies the device type, performing vocoder bypass.

2. The method of claim 1, wherein the area code extension identifies a network service provider.

3. The method of claim 1, wherein the first identifier comprises a differentiated telephone number for the first station, and the second identifier comprises a differentiated telephone number for the second station.

4. The method of claim 1 further comprising a computer readable medium having stored therein instructions for causing a processor to execute the steps of the method of claim 1.

5. The method of claim 1, wherein the device type is a mobile station.

6. A method for performing vocoder bypass in a wireless telecommunications network, the method comprising:
receiving a first identifier for a first station and a second identifier for a second station;
determining whether the first identifier facially identifies a device type by determining whether the first identifier includes a first predetermined aspect indicative of a mobile station;
determining whether the second identifier facially identifies a device type by determining whether the second identifier includes a second predetermined aspect indicative of a mobile station, wherein at least one of the first predetermined aspect and the second predetermined aspect comprise a predetermined area code; and
responsive to a determination that the first identifies facially identifies the device type and the second identifier facially identifies the device type, performing vocoder bypass.

7. The method of claim 6, wherein the predetermined area code identifies a network service provider.

8. The method of claim 6, wherein the first identifier comprises a differentiated telephone a number for the first station, and the second identifier comprises a differentiated telephone number for the second station.

9. The method of claim 6, further comprising a computer readable medium having stored therein instructions for causing a processor to execute the steps of the method of claim 6.

10. The method of claim 6, wherein the device type is a mobile station.

11. A method carried out at an intermediate entity in communication with a first mobile station and a terminating node, the method comprising:
receiving an identifier for the terminating node from the first mobile station via a wireless telecommunications network;
determining whether the identifier includes a predetermined aspect that facially identifies the terminating node as a second mobile station, wherein the predetermined aspect is selected from the group consisting of an area code extension and a predetermined area code; and
performing vocoder bypass if the identifier includes the predetermined aspect.

12. The method of claim 11 further comprising determining a corresponding network service provider based on the predetermined aspect.

13. The method of claim 12, wherein the step of determining a corresponding network service provider comprises providing the predetermined aspect to a circuit to determine the corresponding network service provider.

14. The method of claim 11 further comprising a computer readable medium having stored therein instructions for causing a processor to execute the steps of the method of claim 11.

15. A method carried out at an intermediate entity in communication with a first mobile station and a terminating node, the method comprising:
receiving an identifier for the terminating node from the first mobile station via a wireless telecommunications network;
determining whether the identifier includes a predetermined aspect that identifies the terminating node as second mobile station, wherein the predetermined aspect comprises an area code extension; and
performing vocoder bypass if the identifier includes the predetermined aspect.

16. A method carried out at an intermediate entity in communication with a first mobile station and a terminating node, the method comprising:
receiving an identifier for the terminating node from the first mobile station via a wireless telecommunications network;
determining whether the identifier includes a predetermined aspect that identifies the terminating node as second mobile station, wherein the predetermined aspect comprises a predetermined area code; and
performing vocoder bypass if the identifier includes the predetermined aspect.

17. An identifier for use in a wireless telecommunications network, the identifier comprising:
a telephone number for a node; and
a predetermined aspect, wherein the predetermined aspect is selected from the group consisting of an area code extension and a predetermined area code, and
wherein the predetermined aspect facially identifies whether the node is a mobile station.

18. The identifier of claim 17, wherein an intermediate entity performs a vocoder bypass if the predetermined aspect identifies the node as a mobile station.

19. The identifier of claim 17, wherein the predetermined aspect corresponds to a network service provider for the node.

20. The identifier of claim 19 wherein the identifier is sent from an initiating mobile station to an the intermediate entity, and the intermediate entity performs a vocoder bypass only the initiating mobile station uses the network service provider.

21. An identifier for use in a wireless telecommunications network, the identifier comprising:
a telephone number for a node; and
a predetermined aspect, wherein the predetermined aspect comprises an area code extension,
wherein the predetermined aspect identifies whether the node is a mobile station.

22. An identifier for use in a wireless telecommunications network, the identifier comprising:
a telephone number for a node; and
a predetermined aspect, wherein the predetermined aspect comprises a predetermined area code,
wherein the predetermined aspect identifies whether the node is a mobile station.

* * * * *